(12) United States Patent
Chang et al.

(10) Patent No.: US 8,970,824 B2
(45) Date of Patent: Mar. 3, 2015

(54) RANGEFINDER

(75) Inventors: Zhang-Ming Chang, Taichung (TW); Hua-Tang Liu, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 253 days.

(21) Appl. No.: 13/418,748

(22) Filed: Mar. 13, 2012

(65) Prior Publication Data
US 2013/0148096 A1 Jun. 13, 2013

(30) Foreign Application Priority Data
Dec. 9, 2011 (TW) .............................. 100145548 A

(51) Int. Cl.
*G01C 3/08* (2006.01)

(52) U.S. Cl.
USPC .......... 356/4.01; 356/3.01; 356/4.1; 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS 5,949,531 A * 9/1999 Ehbets et al. ................ 356/5.01
2007/0263202 A1* 11/2007 Ohtomo et al. .............. 356/4.01

* cited by examiner

*Primary Examiner* — Luke Ratcliffe
(74) *Attorney, Agent, or Firm* — Tracy M. Heims; Apex Juris, pllc

(57) ABSTRACT

A rangefinder for measuring a distance of an object includes a case, in which a refractor, a measuring light source, a light receiver, a receiving lens, a reference light source, and a reflector are provided. The measuring light source emits measuring light to the refractor, and the refractor refracts the measuring light to the object. The measuring light reflected by the object emits to the light receiver through the receiving lens. The reference light emits reference light to the reflector, and the reflector reflects the reference light to the light receiver. The refractor and the reflector may be turned for calibration.

9 Claims, 7 Drawing Sheets

1

RANGEFINDER

BACKGROUND OF THE INVENTION

1. Field of the Invention

The present invention relates generally to a device for measuring distance, and more particularly to a rangefinder.

2. Description of the Related Art

As the advancement of measurement of distance, optical rangefinder is the commonest device in distance measuring. It is easy and precisely in long distance measurement.

FIG. 1 shows a conventional optical rangefinder 2, including a case 50, a light receiver 51, a reference light source 52, a reflector 53, and a measuring light source 54. The light receiver 51 is mounted in the case 50. The reference light source 52 is mounted on the case 50 by two bolts 60 to emit reference beam L3. The reflector 53 is mounted in the case 50 to reflect the reference beam L3 to the light receiver 51. The measuring light source 54 is mounted on the case 50 by four bolts 61 to emit measuring beam L4 to an object 110. The measuring beam L4 is reflected by the object 110 and emits to the light receiver 51. The optical rangefinder 2 finds a difference between phases of the reference beam L3 and the measuring beam L4 in the light receiver 51 to obtain a distance between the object 110 and the rangefinder 2.

Such rangefinders 2 have to be calibrated in the manufacture. The way of calibration is to turn the bolts 60, 61 for adjustment of a distance between the reference light source 52 and measuring light source 54. However, it is not easy to turn the bolts 60, 61. Too tight or too loose may affect the arrangement and durability of the rangefinder 2. In other words, when the bolts 60 or 61 are too loose, it may cause the reference light source 52 and/or the measuring light source 54 shift. When the bolts 60 or 61 are too tight, it will break the reference light source 52 and/or the measuring light source 54. Consequently, it still has some places in the conventional rangefinder to be improved.

SUMMARY OF THE INVENTION

The primary objective of the present invention is to provide a rangefinder, which may be calibrated in a fast and easy way and has less risk to cause damage in calibration.

According to the objective of the present invention, a rangefinder for measuring a distance of an object includes a case, in which a refractor, a measuring light source, a light receiver, and a receiving lens are provided. The refractor is movably mounted in the case, and has an entering side and an emitting side. The entering side is not parallel to the emitting side. The measuring light source emits measuring light to the entering side of the refractor, and the measuring light leaves the refractor via the emitting side and emits to the object. The measuring light reflected by the object emits to the light receiver through the receiving lens.

The present invention further provides a rangefinder, including a case, a measuring light source, a light receiver, a receiving lens, a reference light source, and a reflector. The measuring light source emits measuring light to the object, and the measuring light reflected by the object emits to the light receiver through the receiving lens. The reference light source emits reference light, and the reflector reflects the reference light to the light receiver.

In an embodiment, the case is provided with a polygonal hole and an opening on a bottom of the polygonal hole, the refractor is received and engaged in the polygonal hole to cover the opening, and measuring light emits through the opening and the refractor.

In an embodiment, the case is provided with a bore, in which the reflector is mounted.

Therefore, it may adjust the measuring light source and the reference light source for calibration in a fast and easy way, and calibration will not damage anything of the rangefinder.

DETAILED DESCRIPTION OF THE INVENTION

Figure 1:
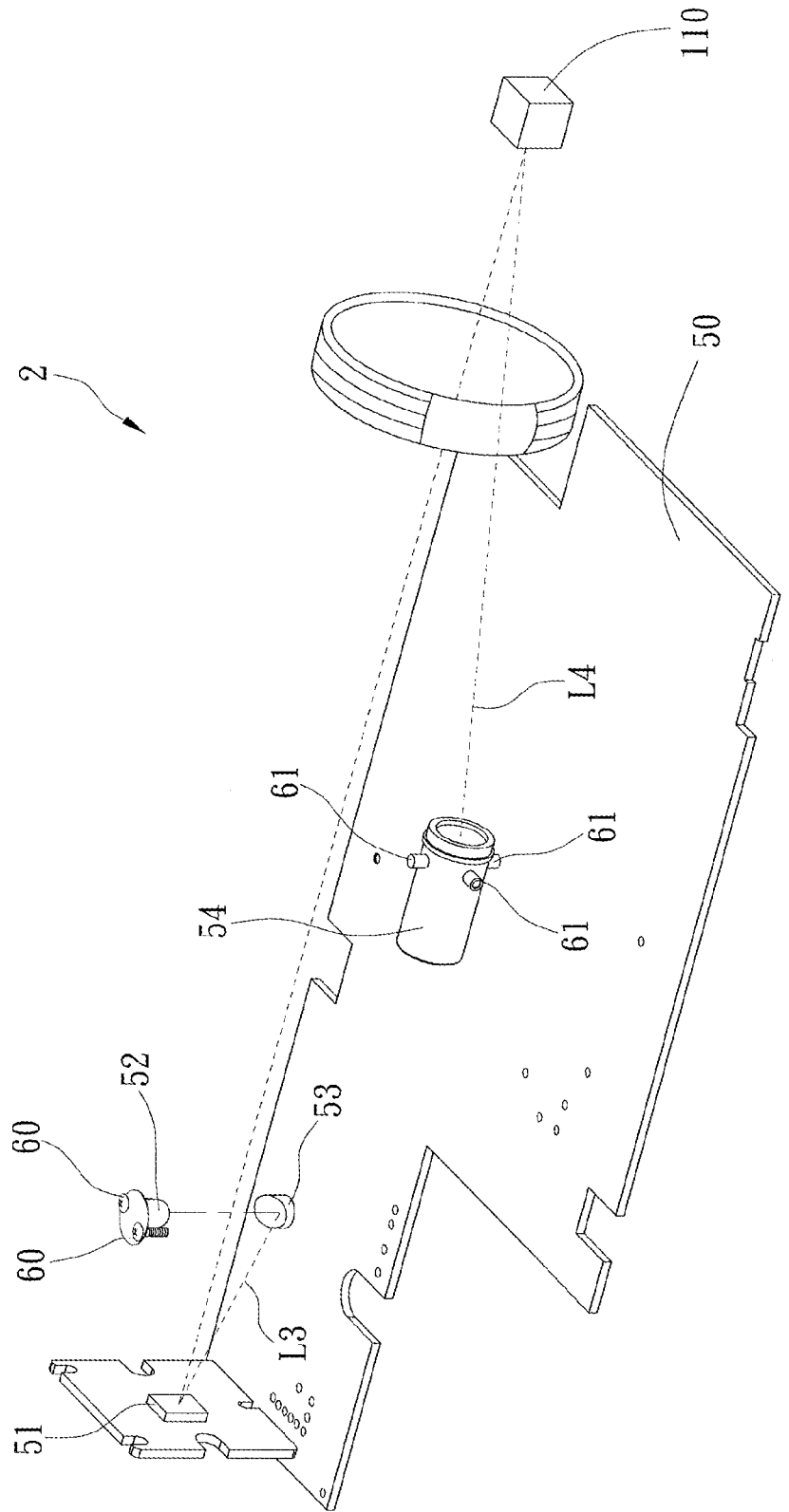
FIG. 1 is a sketch diagram of the conventional optical rangefinder.
Figure 2:
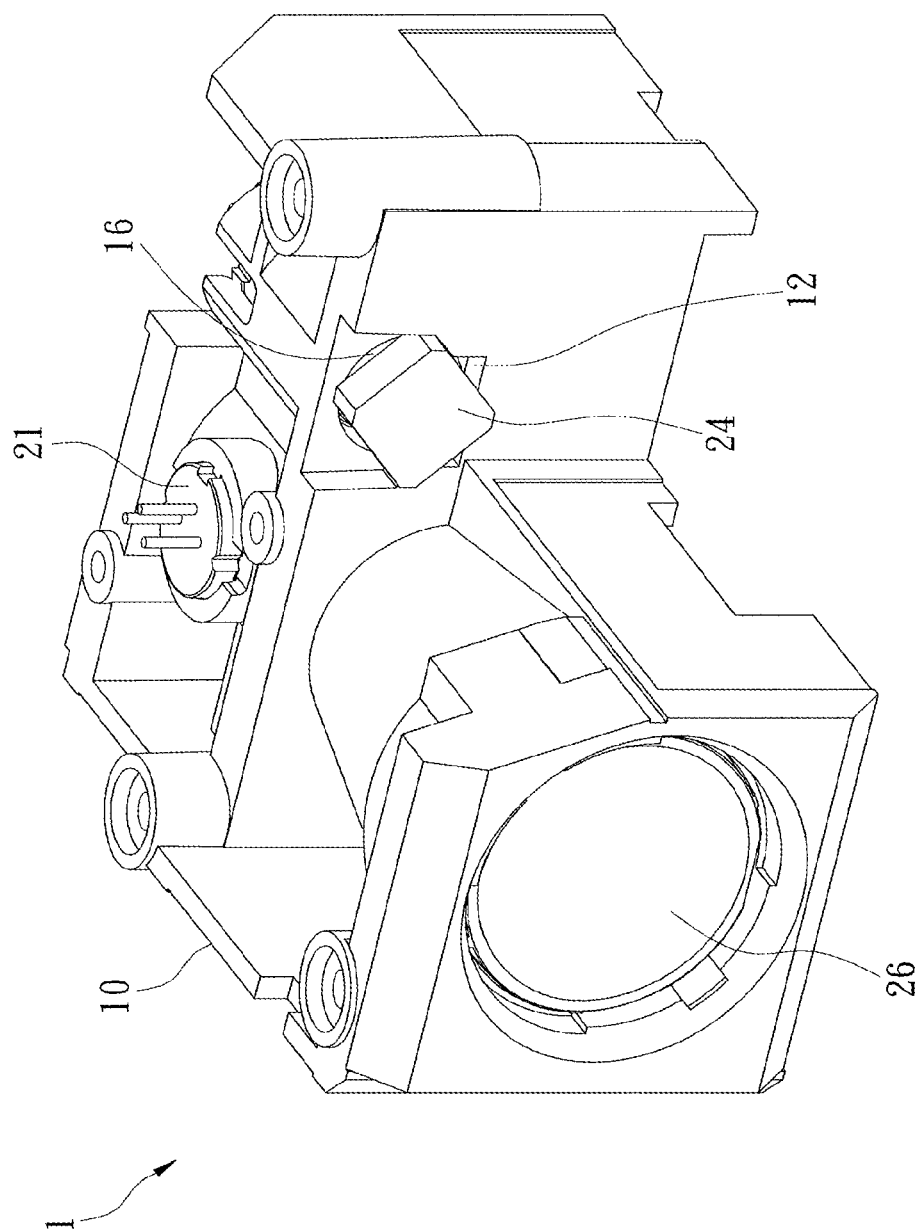
FIG. 2 is a perspective view of a preferred embodiment of the present invention.
Figure 3:
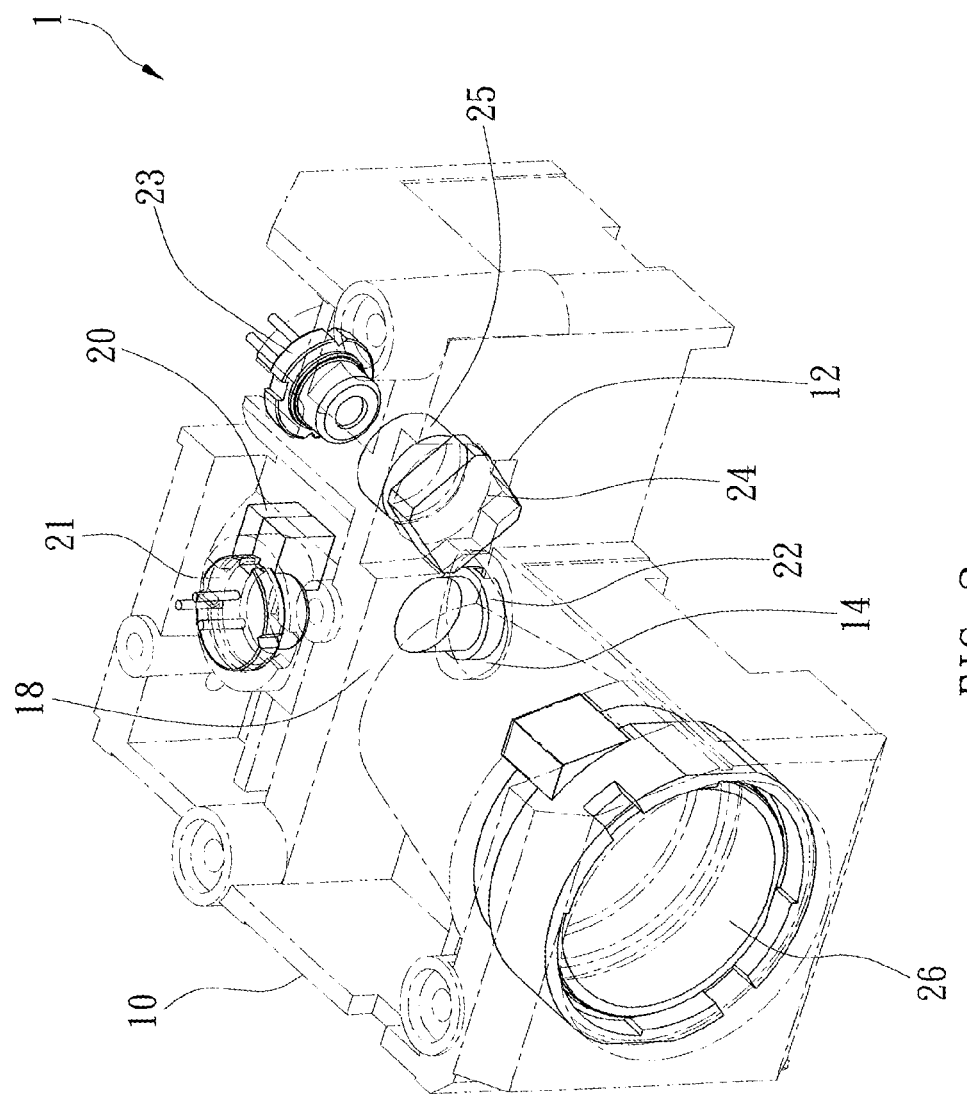
FIG. 3 is a perspective view of the preferred embodiment of the present invention, showing inside of the case.
Figure 4:
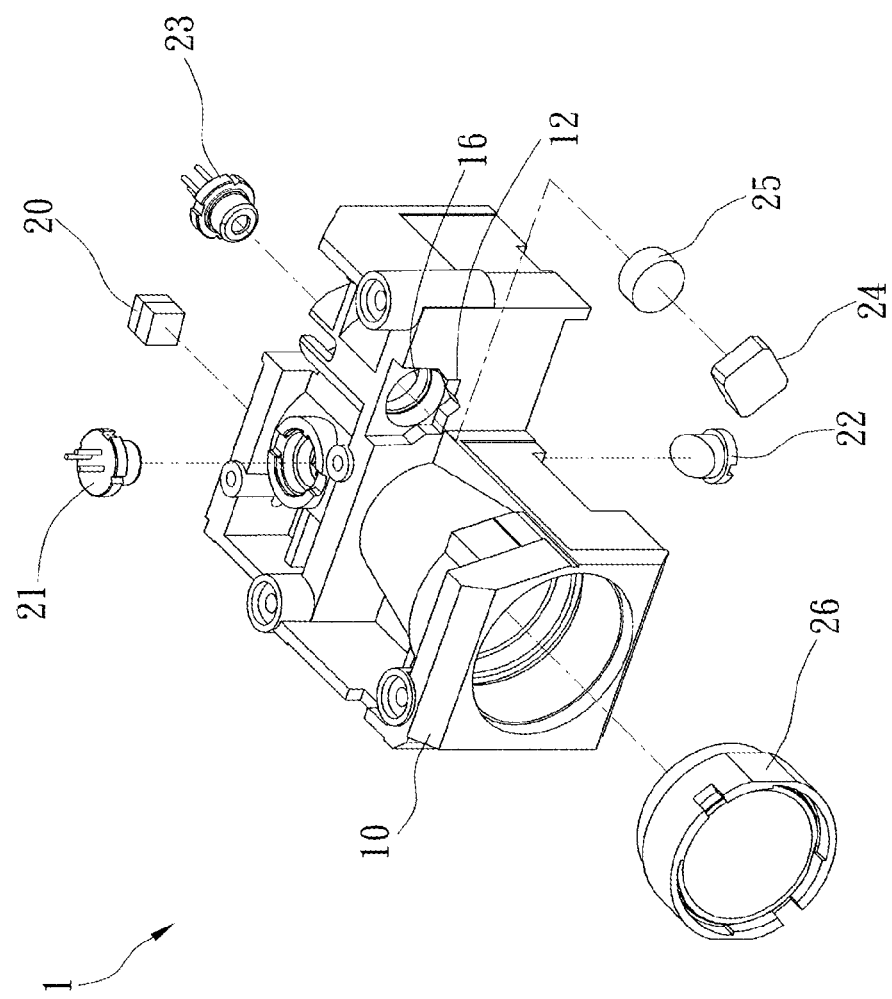
FIG. 4 is an exploded view of the preferred embodiment of the present invention.

As shown in FIGS. from FIG. 2 to FIG. 4, a rangefinder of the preferred embodiment of the present invention includes a case 10, a light receiver 20, a reference light source 21, a reflector 22, a measuring light source 23, a refractor 24, a parallelizing lens 25, and a receiving lens 26.

The case 10 has a polygonal slot 12 and a bore 14. On a bottom of the polygonal slot 12 has an opening 16. The case 10 has a chamber 18 therein, and the polygonal slot 12 and the bore 14 re communicated with the chamber 18.

The light receiver 20 is provided in the chamber 18 of the case 10. In the present invention, the light receiver 20 is an avalanche photodiode (APD). Other devices with the same function may be used in the present invention.

Figure 5:
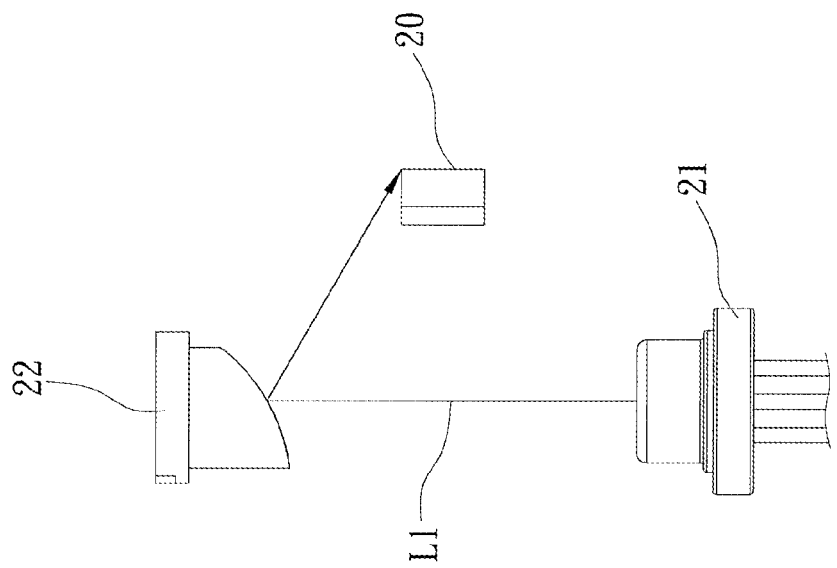

As shown in FIG. 5, the reference light source 21 is provided in the chamber 18 of the case 10 to emit reference light L1. In the present invention, the reference light source 21 is a laser light emitting diode (laser LED). Other devices with the same function may be used in the present invention.

Figure 6:
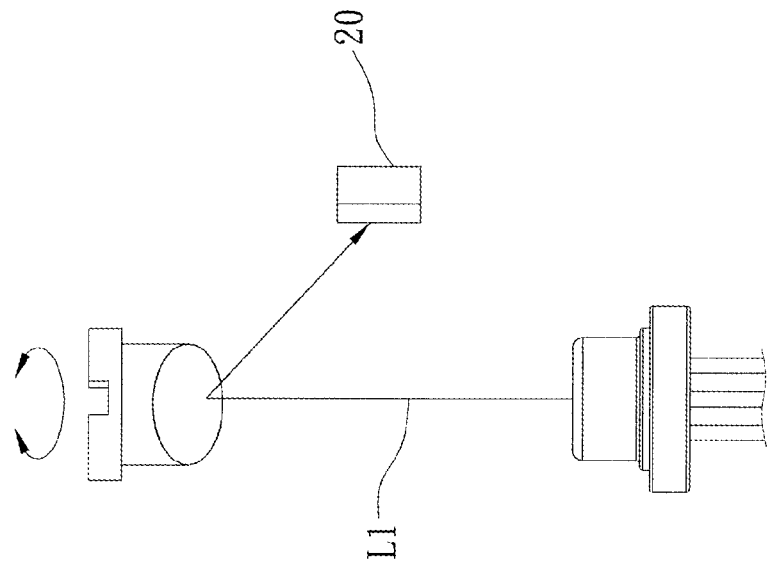
FIG. 5 and FIG. 6 are sketch diagrams of the preferred embodiment of the present invention, showing calibration by turning the reflector.

As shown in FIG. 6, the reflector 22 is provided in the bore 14 of the case 10 and is able to be turned. The reflector 22 is on a path of the reference light L1 to reflect the reference light L1 to the light receiver 20 by turning the reflector 22.

Figure 7:
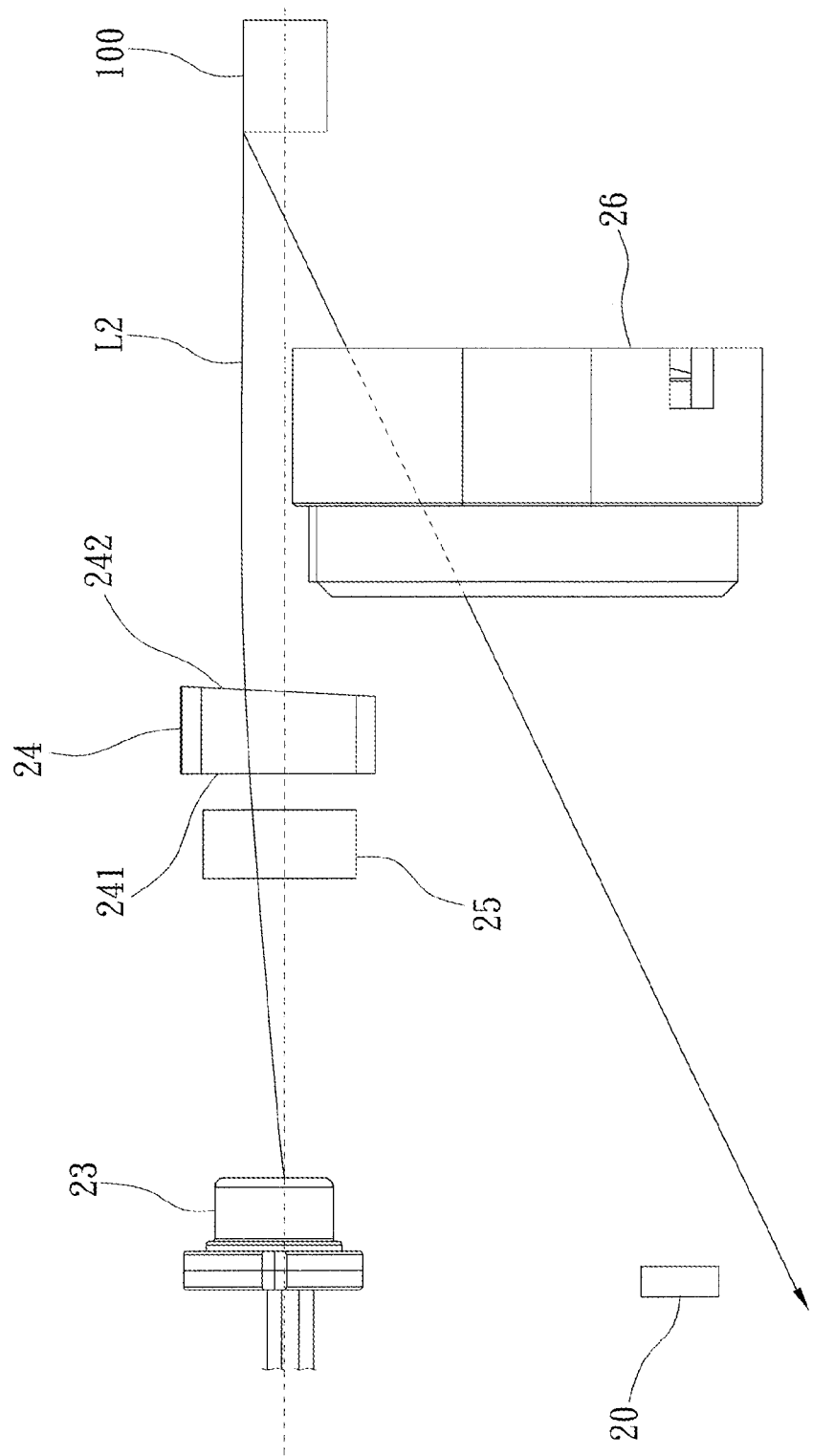
FIG. 7 and FIG. 8 are sketch diagrams of the preferred embodiment of the present invention, showing calibration by turning the refractor.

As shown in FIG. 7, the measuring light source 23 is provided in the chamber 18 of the case 10 to emit measuring light L2 to an object 100. In the present invention, the measuring light source 23 is a laser LED. Other devices with the same function may be used in the present invention.

Figure 8:
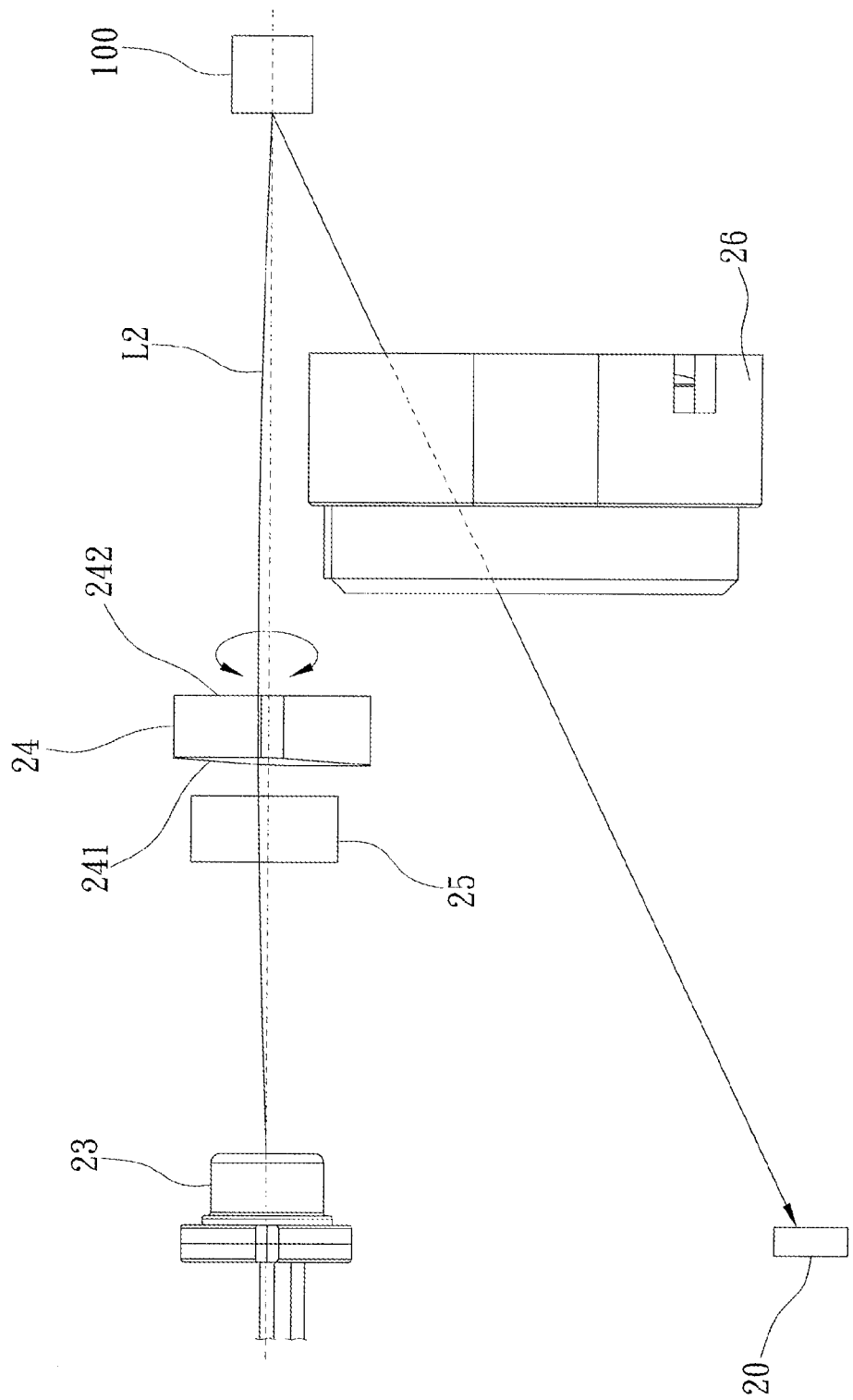

As shown in FIG. 8, the refractor 24 is turned to a predetermined angle, and then is put in the polygonal slot 12. In the present invention, the refractor 24 is a wedge-shaped lens to engage the polygonal slot 12. The refractor 24 has an entering side 241 and an emitting side 242. The entering side 241 and the emitting side 242 are not parallel. The measuring light L2 from the measuring light source 23 emits to the refractor 24 through the opening 16. The measuring light L2 enters the refractor 24 via the entering side 241, and leaves via the emitting side 242. The measuring light L2 will emit to the object 100 after leaving the refractor 24. User may turn the refractor 24 to precisely reflect the measuring light L2, after reflected by the object 100, to the light receiver 20. The polygonal slot 12 makes the refractor 24 to be turned for a constant angle once.

The parallelizing lens 25 is provided in the opening 16 on the bottom of the polygonal slot 12 and between the measuring light source 23 and the refractor 24 to parallelize the measuring light L2.

The receiving lens 26 is provided on the case 10 and is on a path of the measuring light L2 back to the light receiver 20. The receiving lens 26 will filter the measuring light L2 to let the measuring light L2 precisely emit to the light receiver 20.

The present invention provides the reflector 22 and the refractor 24 to be turned to let the reference light L1 and the measuring light L2 precisely emit to the light receiver 20. Therefore, the rangefinder may obtain the distance of the object 100 according to a difference of the phases of the reference light L1 and the measuring light L2 in the light receiver 20. Compare with the conventional rangefinder, no bolt is used in the rangefinder 1 of the present invention, so that it may have an easy way of calibration and less risk of causing damage in calibration.

In the preferred embodiment, we provide the reflector 22 and the refractor 24 to be turned to adjust the paths of the reference light L1 and the measuring light L2. In practice, any type of movement of the reflector 22 and the refractor 24 which may adjust the paths of the reference light L1 and the measuring light L2 is able to be used in the present invention. The refractor 24 may be turned by any solution except the polygonal slot as described in the present invention. After calibration, the reflector 22 and the refractor 24 may be fixed by UV glue or other fixing means. The description above is a few preferred embodiments of the present invention and the equivalence of the present invention is still in the scope of claim construction of the present invention.

What is claimed is:

1. A rangefinder for measuring a distance between an object and the rangefinder, comprising:
    a case;
    a refractor movably mounted in the case, wherein the refractor has an entering side and an emitting side, and the entering side is not parallel to the emitting side;
    a measuring light source provided in the case to emit measuring light, wherein the measuring light enters the refractor via the entering side, leaves the refractor via the emitting side, and emits to the object;
    a light receiver provided in the case;
    a receiving lens provided on the case, wherein the measuring light reflected by the object emits to the light receiver through the receiving lens;
    a reference light source provided in the case to emit reference light;
    a reflector movably mounted in the case to reflect the reference light to the light receiver; and
    wherein the refractor and the reflector are movable during calibration of the rangefinder and are fixed after calibration.

2. The rangefinder as defined in claim 1, wherein the refractor is a wedge-shaped lens.

3. The rangefinder as defined in claim 1, further comprising a parallelizing lens between the measuring light source and the refractor.

4. The rangefinder as defined in claim 1, wherein the refractor is turned to a predetermined angle where the refractor refracts the measuring light to the object, and then is mounted in the case.

5. The rangefinder as defined in claim 4, wherein the case is provided with a polygonal hole and an opening on a bottom of the polygonal hole.

6. The rangefinder as defined in claim 5, wherein the refractor is engaged in the polygonal hole to cover the opening.

7. The rangefinder as defined in claim 1, wherein the refractor is adjusted to precisely emit the measuring light to the light receiver, and the reflector is adjusted to precisely emit the reference light reflected by the object to the light receiver.

8. The rangefinder as defined in claim 7, wherein the reflector is rotatably mounted in the case.

9. The rangefinder as defined in claim 8, wherein the case is provided with a bore, in which the reflector is rotatably mounted.

* * * * *